April 16, 1968   V. C. DRAUGELIS ET AL   3,378,255
PAPER HANDLING APPARATUS

Filed June 13, 1966   10 Sheets-Sheet 1

INVENTORS
VAIDEVUTIS C. DRAUGELIS
JAOL C. JAMISON
BY
ATTORNEYS

April 16, 1968  V. C. DRAUGELIS ET AL  3,378,255
PAPER HANDLING APPARATUS

Filed June 13, 1966  10 Sheets-Sheet

INVENTORS
VAIDEVUTIS C. DRAUGELIS
JAOL C. JAMISON
BY
ATTORNEYS

INVENTORS
VAIDEVUTIS C. DRAUGELIS
JAOL C. JAMISON
BY

ATTORNEYS

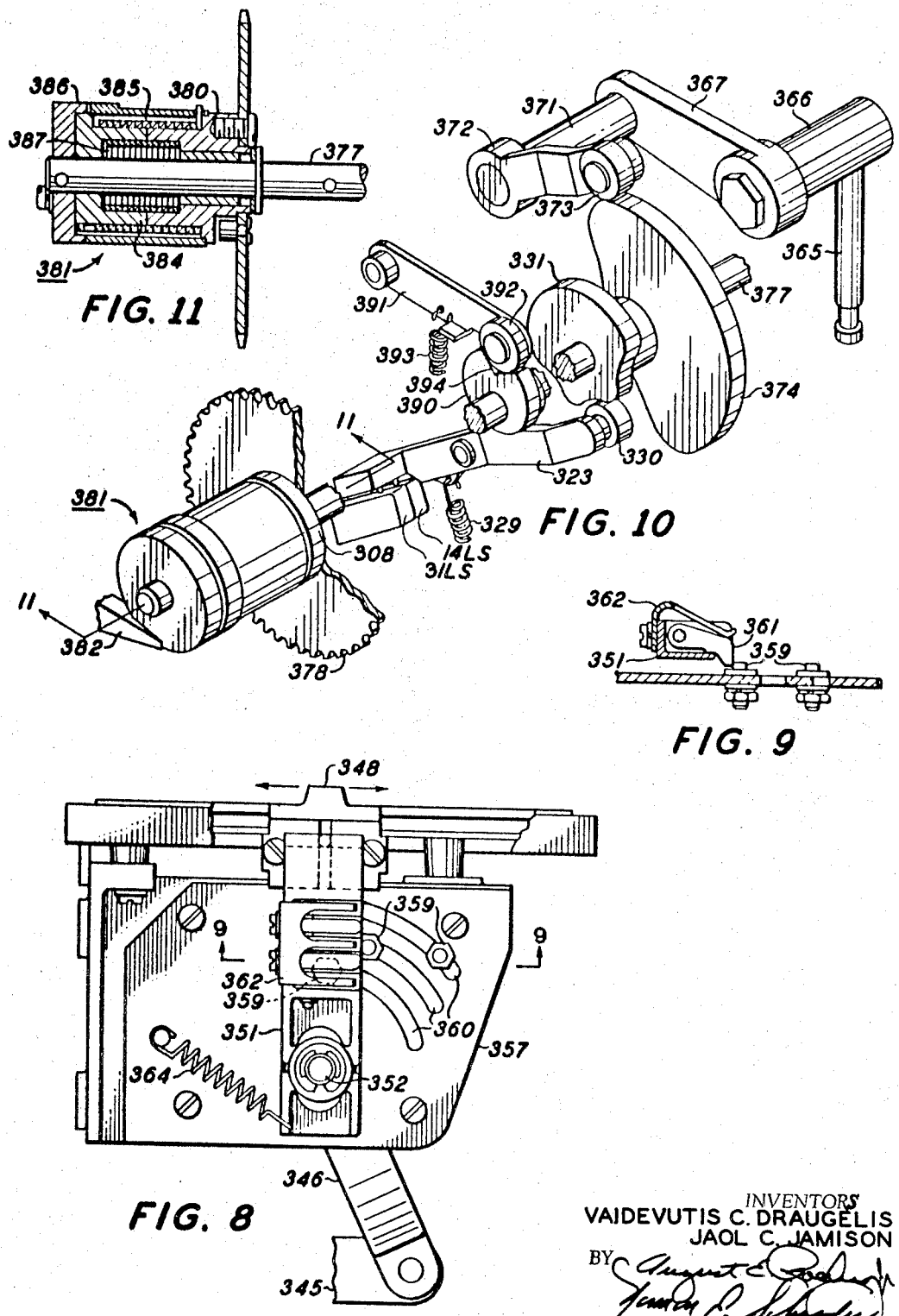

INVENTORS
VAIDEVU TIS C. DRAUGELIS
JAOL C. JAMISON
BY
ATTORNEYS 3,378,255
PAPER HANDLING APPARATUS
Vaidevutis C. Draugelis, Rochester, and Jaol C. Jamison, Webster, N.Y., assignors to Xerox Corporation, Rochester, N.Y., a corporation of New York
Filed June 13, 1966, Ser. No. 557,063
7 Claims. (Cl. 271—62)

ABSTRACT OF THE DISCLOSURE

Paper handling apparatus for permitting the topmost sheet of a stack of sheets to be forwarded by reciprocating section tubes. The paper handling apparatus comprises a tray for supporting the stack, aerating elements to fan the topmost sheets from the rest of the stack and constraining elements including resilient tabs to limit the amount of vertical movement of the fanned sheets so that the topmost sheet is at the proper height for being forwarded by the suction tubes.

---

This invention relates in general to paper handling apparatus and, in particular, to a sheet feed mechanism for seriatim feeding sheets of support material to a xerographic plate.

More specifically, this invention relates to a sheet feed mechanism having an improved pack advancer and sheet feeding appurtenances to advance a pack or stack of sheet material periodically to a predetermined height whereby the topmost sheet of the stack is in proper operating relation to a sheet forwarding and advancing mechanism for seriatim feeding of the sheet material without misfeeding or multiple sheet feeding throughout extreme ambient humidity conditions. The invention of this application is particularly well adapted to be used in cooperation with a xerographic reproducing machine such as that disclosed in copending application Ser. No. 400,542, filed Sept. 30, 1964, now Patent No. 3,301,126 in the name of R. F. Osborne et al.

In xerographic reproducing machines of the type disclosed in the above-referenced copending application, it is necessary that the mechanism be operable by an unskilled, casual operator throughout an extremely wide range of ambient environmental conditions. In prior xerographic reproducing machines, the sheet handling mechanism has been of the type wherein a small quantity of paper is retained in a fixed position, fed into the apparatus at slow speeds, and, therefore, unaffected by extreme ambient environmental conditions. However, as the science of xerography has progressed faster machines have been developed necessitating a substantially greater quantity of sheet material to be utilized with the machine and fed thereto at a speed much greater than that of previous devices. Prior art sheet feeding and pack advancing mechanisms capable of holding the desired large quantity of sheet material and forwarding this material at a high rate of speed have been of the type used in cooperation with such mechanisms as offset presses and multilith machines. The complex nature of such equipment requires that a skilled, highly-trained attendant operate the mechanism and continually manually adjust the sheet fed mechanism to prevent misfeeding or multiple sheet feeding in the event of changes in the environmental conditions. In the event of extreme conditions of relative humidity, such equipment is utilized in an environmental conditioned room or not operated during these extremes. The present invention comprises a new sheet handling mechanism capable of retaining a large quantity of sheet material for processing through operative ranges of approximately 15% to 85% relative humidity.

During extreme humidity conditions, various types of deformities occur to distort the pack of paper and especially the topmost sheets. There are several types of this distortion. The paper can have a top to bottom warp with the center portion of the paper convex and the leading edge of the paper curved down. When in this condition, difficulty is encountered in utilizing the vacuum sheet feeding device in that improper vacuum pickup results in misfeeding the topmost sheet or resulting in the leading edge curling under as the sheet is forwarded to the paper transport mechanism creating a paper jam or a folded sheet. Another type of distortion is top to bottom warp with the leading and trailing portions of the sheet curved up. In this type of distortion, the center portion of the sheet is not engaged by the vacuum sheet feeders and the sheet is not fed toward the paper transport mechanism.

Another type of distortion is commonly referred to as end-to-end warp with the side portions of the sheet material bent down and the middle portion convex. This distortion would cause only the center portion of the sheet to be engaged by the vacuum sheet feeders and upon forwarding the sheet to the paper transport mechanism a jamming of the outer portions of the sheet with the mechanism resulting in a misfed or a folded sheet. Another distortion of sheet material due to extreme conditions of relative humidity is a convex curvature of the entire sheet resulting in not feeding or improper feeding of the sheet by the vacuum sheet feeders, creating paper jams upon forwarding the sheet to the paper transport mechanism generally at the leading portions of the sheet resulting in a folding of the sheet's corners. Although these various distortions of the sheet material have been referred to separately, it is quite common for the distortions to occur in combination and to be of a non-symmetrical nature.

It is, therefore, an object of this invention to improve pack advancer mechanisms for use in a sheet handling mechanism for automatically advancing a sheet material to a predetermined height upon response to slight variations in the height of the paper stack.

Another object of this invention is to improve sheet handling mechanisms whereby the stack cannot be advanced above a predetermined height.

A further object of this invention is to improve sheet handling mechanisms whereby the topmost sheet is constrained in a predetermined manner to enable the sheet to be fed from the top of the stack into a sheet conveying mechanism.

Another object of this invention is to improve sheet handling mechanisms whereby the topmost sheet is released from certain of the constraining forces at the time the sheet is fed from the top of the stack into a sheet conveying mechanism.

Still another object of this invention is to improve sheet handling mechanisms by constraining the entire quantity of sheet material supported by the pack advancer in a predetermined configuration.

These and other objects are attained in accordance with the present invention wherein there is provided a pack advancer mechanism having a concave support tray for retaining a quantity of sheet material in a predetermined configuration, a sensor bar traversing the top of the stack of sheet material to constrain the topmost sheet in a predetermined configuration, the sensor being oscillated into and out from contact with the topmost sheet during the sheet feeding cycle, a floating roller to constrain the topmost sheet, stationary flexible snubbers to restrain the leading edge of the topmost sheet in a desired configuration and to prevent the feeding of multiple sheets, floating restraining pins to engage the forward corners of the topmost sheet to constrain the sheet in a predetermined configuration, guides to prevent the leading edge of the topmost sheet from being folded during the feeding cycle, and a canted roller to constrain the topmost sheet in a predetermined manner for advancing by a sheet conveying mechanism.

Further objects of this invention, together with additional features contributing thereto and advantages accruing therefrom will be apparent from the following descriptions of an embodiment of the invention when read in conjunction with the accompanying drawings, wherein:

FIG. 8 is a view taken along lines 8—8 of FIG. 3;

FIG. 9 is a sectional view taken along lines 9—9 of FIG. 8;

FIG. 10 is a perspective view of the drive system of the sheet feed mechanism;

FIG. 11 is a sectional view of the clutch mechanism taken along lines 11—11 of FIG. 10.

In the process of xerography, for example, as disclosed in Carlson Patent No. 2,297,691, a xerographic plate comprising a layer of photoconductive material on a conductive backing is given a uniform electric charge over its surface and then exposed to the subject matter to be reproduced by various projection techniques. This exposure discharges the plate in accordance with the light intensity reaching it thereby creating an electrostatic latent image on or in the plate.

Development of the image is effected by developers which comprise, in general, a mixture of suitable resin based powder, hereinafter referred to as toner, and a granular carrier material which functions to carry and to generate triboelectric charges on the toner. More specifically, the function of the carrier material is to provide mechanical control of the toner, or to carry the toner to an image surface, and simultaneously provide almost complete homogeneity of charge polarity. In the development of the image, the toner powder is brought into surface contact with the photoconductive coating and is held thereon electrostatically in a pattern corresponding to the electrostatic latent image. Thereafter, the developed xerographic image may be transferred to a support material to which it may be fixed by any suitable means.

Figure 1:
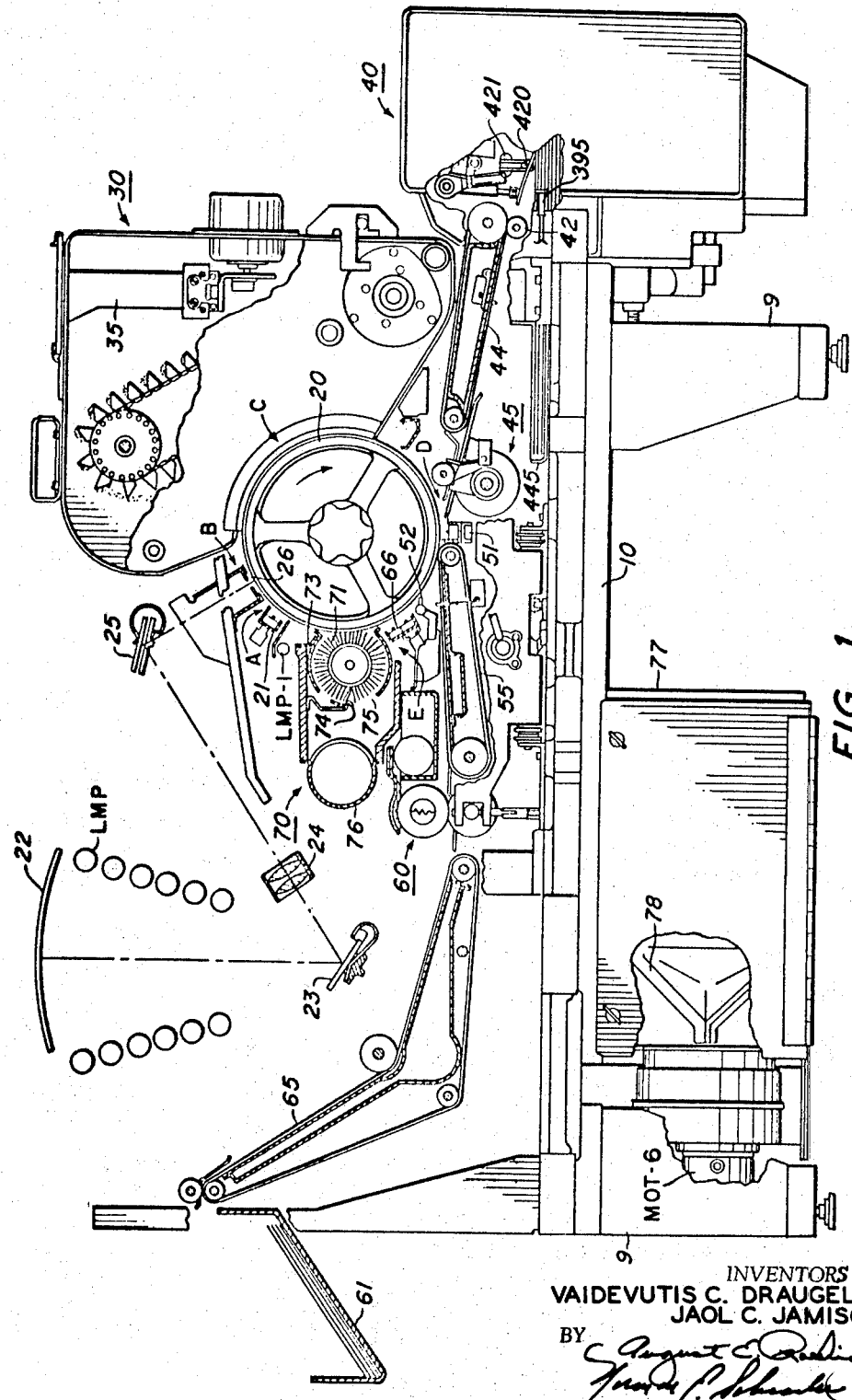
FIG. 1 illustrates schematically a preferred embodiment of a xerographic reproducing machine having a sheet feed mechanism constructed in accordance with the invention.

As shown schematically in FIG. 1, the automatic xerographic reproducing machine includes a xerographic plate 20 including a photoconductive layer or light receiving surface on a conductive backing, journaled in a frame to rotate in the direction indicated by arrow to cause the plate surface sequentially to pass a plurality of xerographic processing stations.

For the purposes of the present disclosure, the several xerographic processing stations in the path of movement of the plate surface may be described functionally, as follows:

A charging station A at which a uniform electrostatic charge is deposited on or in the photoconductive surface;

An exposure station B at which a light or radiation pattern of copy to be reproduced is projected onto the plate surface to dissipate the charge in the exposed areas thereof, and thereby form a latent electrostatic image of the copy to be produced;

A developing station C at which the xerographic developing material including toner particles having an electrostatic charge opposite to that of the electrostatic latent image are cascaded over the plate surface, whereby the toner particles adhere to the electrostatic latent image to form a toner powder image in the configuration of the copy being reproduced;

A transfer station D at which the toner powder image is electrostatically transferred from the plate surface to a transfer material or a support surface; and A drum cleaning and discharge station E at which the plate surface is brushed to remove residual toner particles remaining thereon after image transfer, and at which the plate surface is exposed to a relatively bright light source to effect substantially complete discharge of any residual electrostatic charge remaining thereon.

It is felt that the preceding description of the xerographic process is sufficient for a better understanding of this invention. Referring now to the subject matter of the invention the sheet feeding mechanism 40 used to separate the topmost sheets one at a time from the top of the stack or pile of sheets and to feed the sheets to the paper transport 44 may be formed as an integral unit of the reproducing apparatus, or as shown may be formed as a separate unit connected to the frame of the reproducing apparatus.

Referring to the drawings which illustrate a preferred embodiment of the invention, there is shown a front frame plate 301 and a rear frame plate 302 connected together and maintained in spaced relation to each other by cross members 303 and tie rods 304. A stack or pile of sheets, indicated as 305, is supported on the movable table 41 between the frame plates 301 and 302.

An adjustable concave tray 39 is secured to the horizontal portion 43 of the table 41 by means of brackets 37 and 38 through which studs 34 and 36 of the concave tray 39 project through the brackets 37 and 38, and are engaged by a suitable lock nut to adjust the degree of concavity which has been found to be preferably from three to four degrees. The table 41 has depending side 306 extending downward to which are secured a pair of extension arms 307 carrying a pair of rollers 308. The rollers 308 are adapted to ride in guide channels 309 secured to frame plates 301 and 302. Thus, the table 41 is movable in a vertical direction between the two frame plates 301 and 302, and is guided in its vertical movement by the rollers 308 in the guide channels 309.

Figure 2:
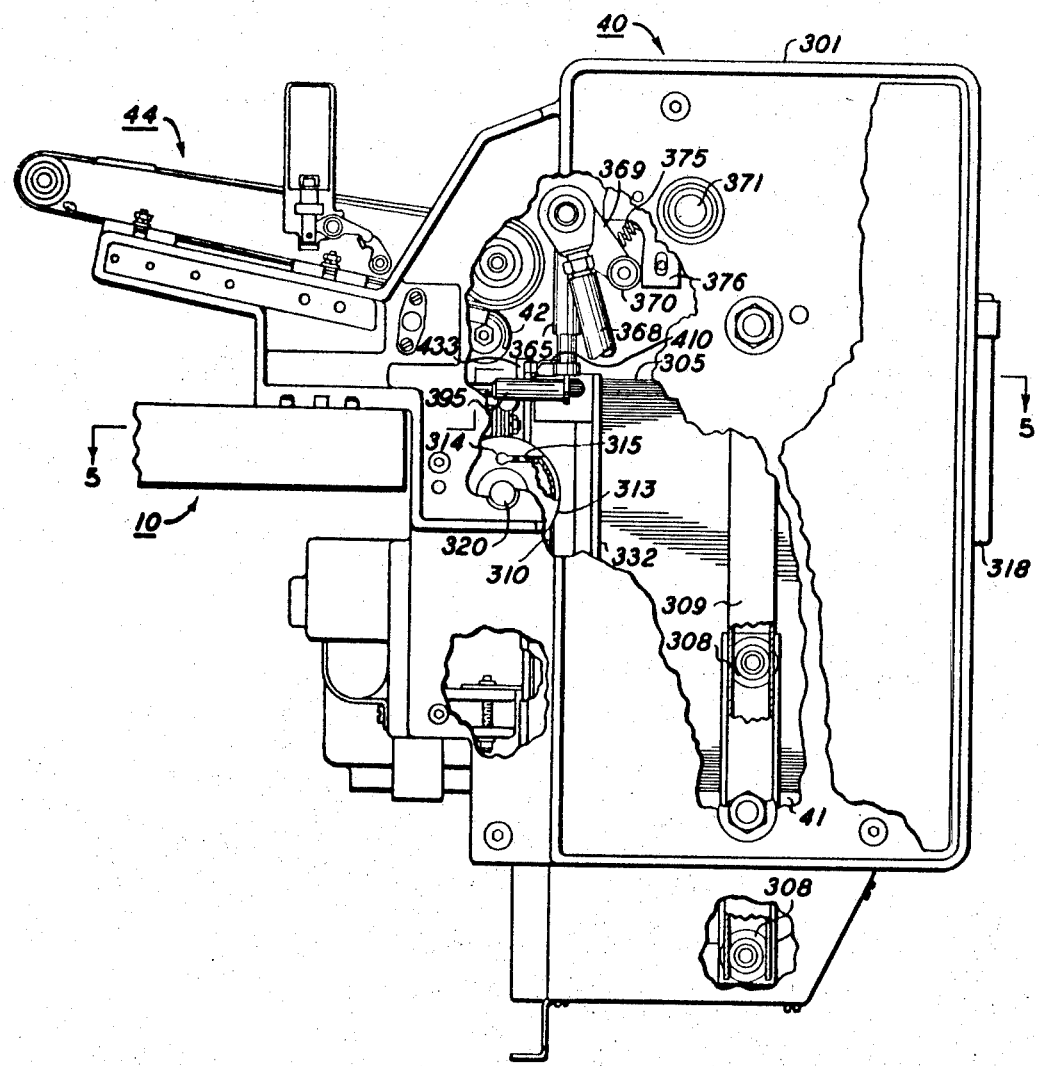
FIG. 2 is a front view of the sheet handling mechanism with portions broken away to show internal operation of the apparatus.
Figure 7:
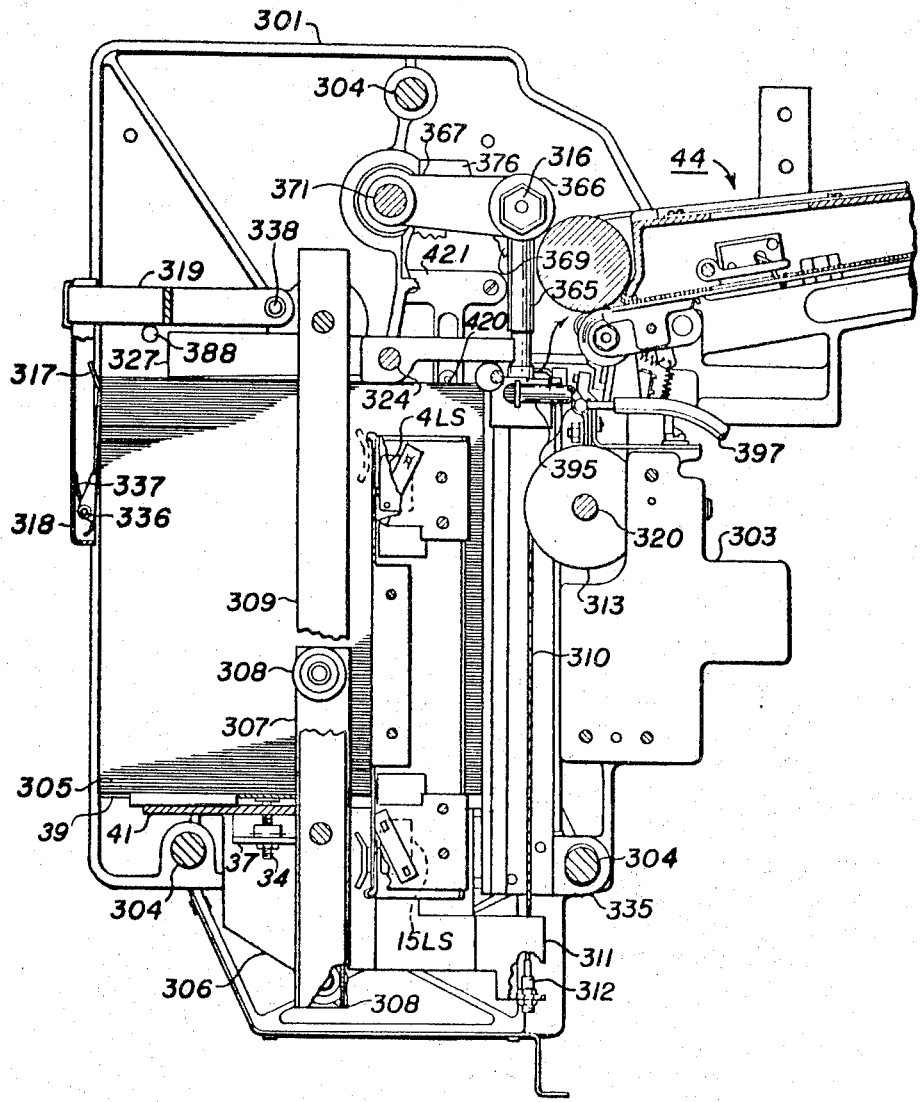
FIG. 7 is a sectional view of the sheet handling mechanism taken along lines 7—7 of FIG. 3.

The table 41 is supported from a pair of cables 310 by means of brackets 311 secured to the table sides 306. Each of the cables 310 has one end secured to the brackets 311 by means of connectors 312, as seen in FIG. 7, and the other end secured to the pulley 313 by means of a bead 314, in a hole and slot 315 in the pulley 313, as shown in FIG. 2.

The pulleys 313 are fixed to a shaft 320 on opposite sides of the table between plates 301 and 302. Shaft 320, journaled in suitable bearings mounted in the plates 301 and 302 is driven to raise or lower the table by means of a gear 321 mounted on a portion of the shaft 320 which extends through the frame plate 302. Driving power is supplied to the gear 321 to rotate shaft 320 to raise and lower table 41 by worm gear 322 on the drive shaft of an index motor MOT-1.

The index motor MOT-1 is connected to a source of electrical power and its operation controlled by index limit switch 14LS, down limit switch 15LS and index switch SW6, shown schematically in the wiring diagrams and described hereinafter. Down limit switch 15LS is secured to plate 302 in position to be actuated by the table as it reaches its lower or bottom position.

The index limit switch 14LS and a tray up interlock switch 31LS, are mounted in side by side relation on the outside of side frame 302, to be actuated by a switch actuating lever 323, pivoted at pin 324. An adjustable stop 325, mounted on the same bracket 326 as the switches 14LS and 31LS, limits the movement of the lever 323 so that these switches are not damaged when the paper supply is excessively low or the table is at the bottom of its downward movement.

The lever 323 is secured to the pin 324, and the pin 324 extends through the side frame plate 302. The opposite end of the pin 324 has the paper level sensing bar 327 secured thereto. The pin 324 is rotatably mounted in the frame plate 302 by means of a bearing 328 so that movement of the sensing bar 327 rotates the pin 324 and the lever 323. The opposite end of the sensing bar 327 is pivotally secured on a stub shaft, not shown, mounted in the side frame 301. The sensing bar is biased downward towards the top of the stack of sheets by a tension spring 329, mounted between the lever 323 and the switch bracket 326.

Figure 3:
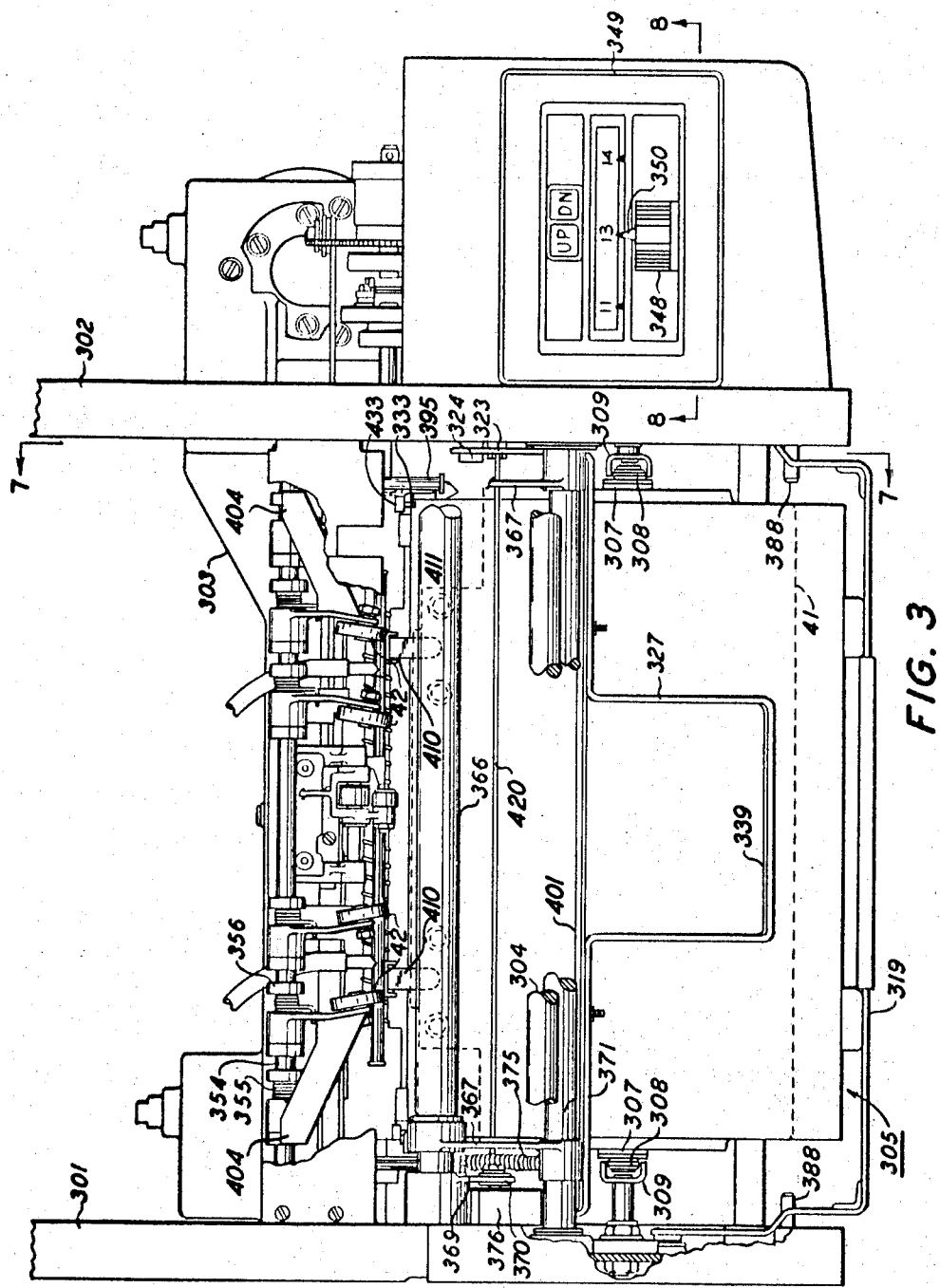
FIG. 3 is a top view of sheet handling mechanisms shown in FIG. 2.
Figure 4:
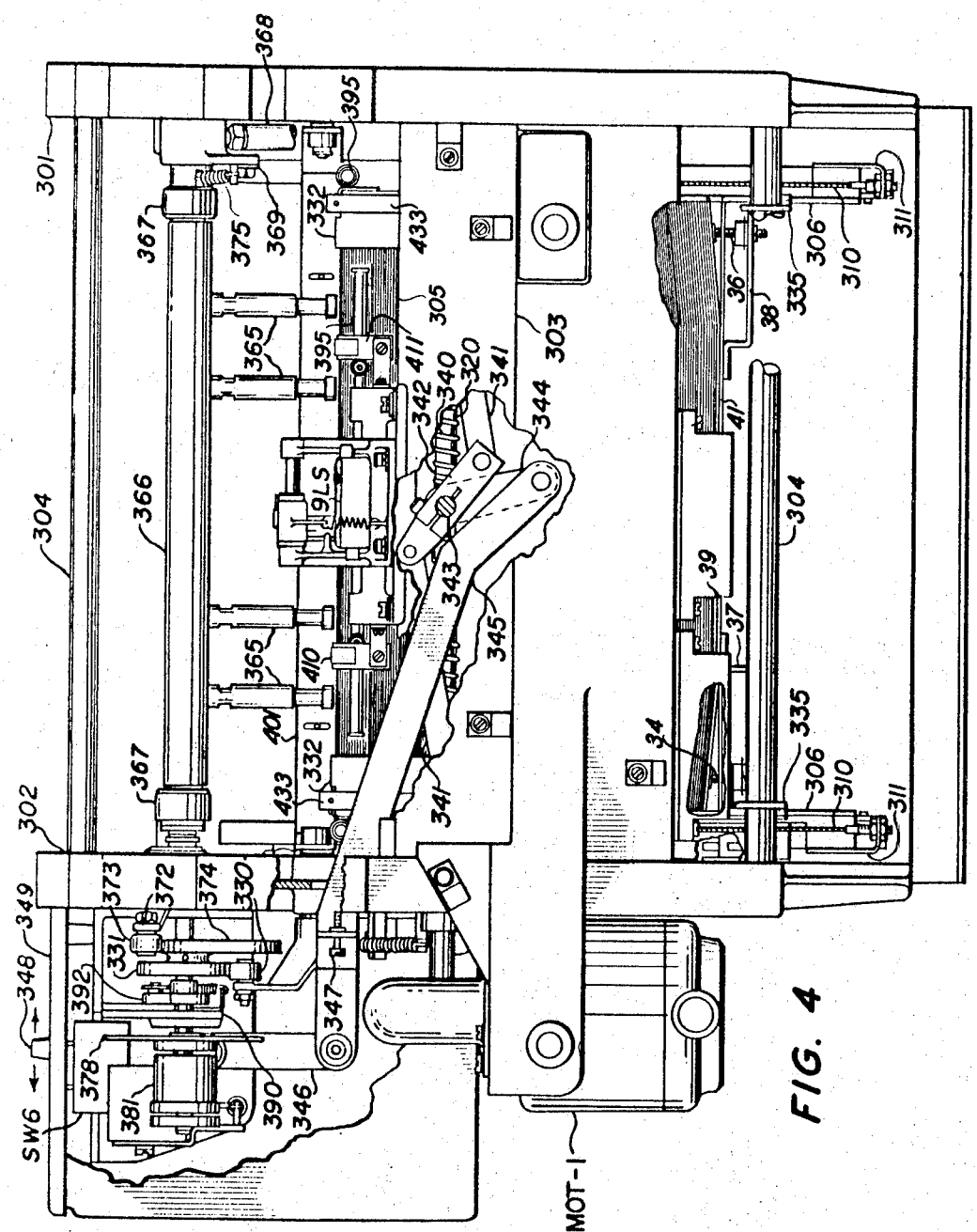
FIG. 4 is a left side of the sheet handling mechanism shown in FIG. 2 with portions broken away to show the internal mechanism of the apparatus.
Figure 5:
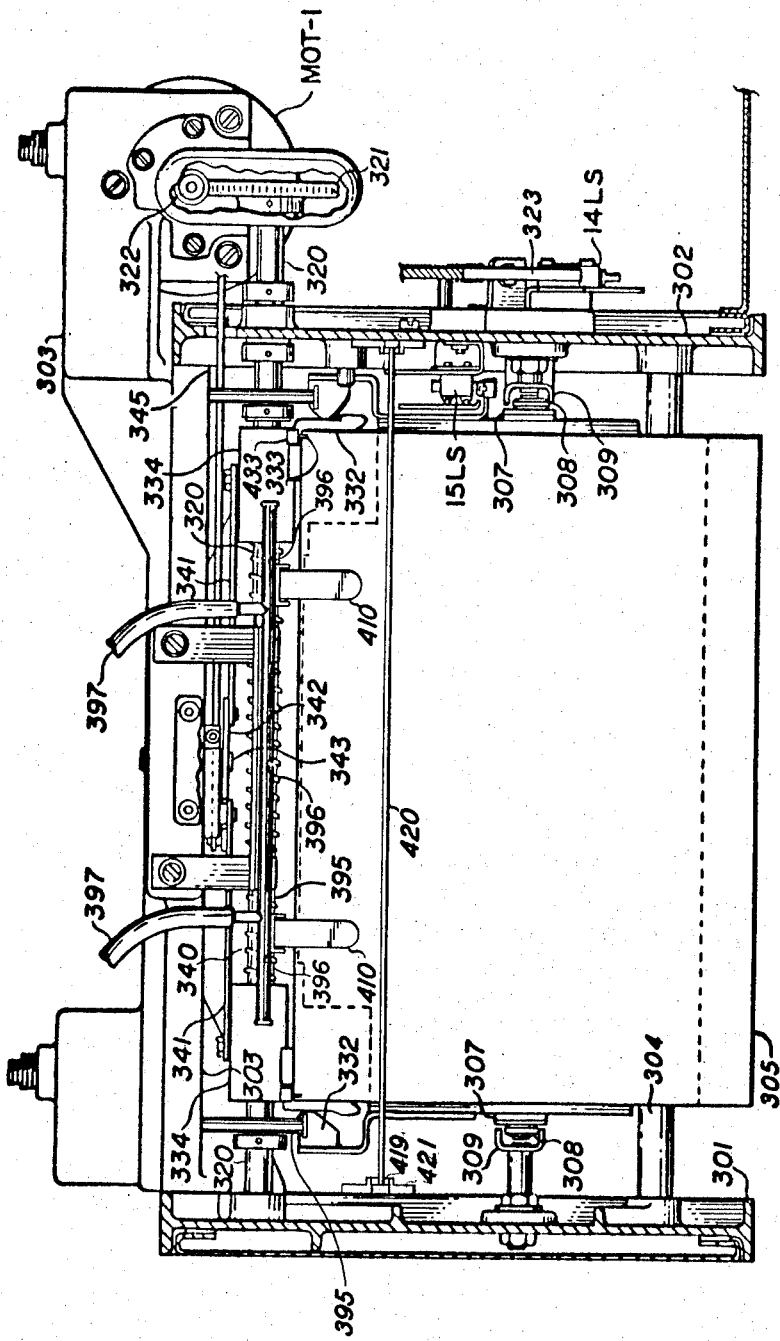
FIG. 5 is a sectional view of the sheet handling mechanism taken along lines 5—5 of FIG. 2.

As shown in FIGS. 3 and 7, the sensing bar 327 is formed in a U-shaped configuration traversing the top of the stack of sheet material 305. Pin 324 and the stub shaft, not shown, support the sensing bar in a position whereby only the center portion 339 of the sensing bar contacts the sheet material. A floating guide bar 401 is slidably supported from the sensing bar 327 by studs secured to the sensing bar and passing through slots in the guide bar 401 so that the bar slides in a vertical plane relative to the sensing bar 327 and, therefore, contacts the stack of sheet material 305.

The opposite end of the lever 323 contains a cam follower 330 which is urged by the spring 329 against a cam 331. Rotation of the cam 331 raises and lowers the sheet sensing bar 327 by means of the lever 323 and pin 324. The movement of the cam 331 is timed with the movement of the sheet feeding so that the sensing bar 327 is raised from the sheet stack at the time the top sheet is fed; thus, the center portion 339 of the sensing bar does not interfere with the individual sheet feeding.

During operation of the sheet feeding mechanism, the sheet sensor 327 drops downward a distance sufficient to actuate switch 14LS by arm 323 after a predetermined number of sheets have been fed. The switch 14LS effects operation of the drive system described above to raise the entire sheet stack to the proper feeding level and to raise sensing arm 327, and, thus, releasing switch 14LS. During continued operation of the sheet feeder, the sheet stack is periodically indexed or raised to the feeding level so that the top of the stack is continuously in a position to feed sheets to the transport system.

In this particular apparatus, the sheet paper is fed edgewise to the xerographic reproducing machine. Therefore, the stack of sheets is arranged on the tray 41 with its longer dimension being transverse to the direction of movement of the sheet material.

The stack is aligned on the tray by means of a pair of adjustable guides 332, located at the leading edge corners of the sheet stack. Each guide 332 has a pin 333 extending over the corner of the stack to restrain the upward movement of the stack when the stack is aerated by the manifold conduits 395. In order to accommodate various size sheets, the guides 332 are adjustable to various positions in the direction of the length of the sheet stack. For example, the guides 332 would be at one position when 8" x 10" sheets are being fed and at different positions when 8½" x 11" or 8½" x 13" sheets are being fed. The guides are slidably mounted on the shaft 320 by a pair of bearing blocks 334 and slidably guided by brackets 335 on a bottom tie rod 304. The guides 332 are urged outward by a compression spring 340, mounted between the bearing blocks 334 with the shaft 320 serving as an internal spring guide. The guides in the bearing blocks can be urged inward towards each other by means of a pair of levers 341 pivotally attached at one end to the bearing blocks 334. The other end of the outboard lever is pivotally connected to a connector bar 342 and the other end of the inboard lever is pivotally connected to crank arm 344. The connector bar 342 is secured to a pin 343 which is journaled in the cross frame member 303. Rotation of the pin 343 is effected by a crank arm 344 secured to the pin and pivotally connected to a connector lever 345. Movement of the connector lever 345 actuates the crank arm 344 which in turn rotates the pin 343 and the connector bar 342. Movement of the connector bar 342 pulls the levers 341 and the bearing blocks 334 either inward against the action of the compression spring 340 or outward with the action of the compression spring 340. The bearing blocks slide along the shaft 320 and carry the brackets 335 along the tie rod 304.

The connector lever 345 extends outward through the rear frame plate 302 terminating at a pivotal connection with a second crank arm 346. Movement of the lever 345 is limited by an adjustable stop 347 which abuts the rear frame plate 302.

Positioning of the paper stack guides 332 to accommodate the appropriate size paper being fed is accomplished by the operator by manually moving lever 348 located on the control panel 349. The lever 348 may be manually moved across the control panel, as seen in FIG. 3, until the pointer 350 indicates the appropriate size paper to be fed. The lever 348 is secured to a paper guide positioning arm 351 which is mounted on a shaft 352 and secured thereto to produce rotational movement of the shaft. The arm 351 is slidable along the shaft and is urged towards a limit plate 357 by means of compression spring 358. The crank 346 is also secured to the shaft 352 so that movement of the lever 348 and the positioning arm 351 produces rotational movement of crank arm 346. In turn, crank arm 346 produces lateral movement of lever 345 and positioning of the guides 332.

The limit plate 357 provides positive stopping positions for the paper width indicator or lever 348. The limit plate has adjustable stops 359 located in a series of arcuate grooves 360 in the plate. A pawl 361 is mounted on the positioning arm 351 to cooperate with the stops 359. The pawls are urged towards the plate 357 by a clip 362 so that they abut the stops 359 upon movement of the arm 351. The stops 359 are positionable within the grooves 360 so that the position of the paper guides 332 may be adjusted according to the size of the paper expected to be used in the machine. As the arm 351 is moved from left to right, as seen in FIG. 8, a pawl 361 abuts the first stop 359 that it encounters. If this is the size of paper being used as indicated on an indicator dial on control panel 349, then movement of the level 348 stops at this point. However, if it is a different size paper that is to be fed, then the lever 348 is moved towards the operator, that is towards the left in FIG. 3, and the arm 351 pivots about point 363 against the action of spring 358 so that a pawl 361 is lifted over the stop 359. With the return of the lever 348 to its original position, continued movement is possible until subsequent stops are encountered by a pawl 361. When the lever 348 and arm 351 are returned to their original position the pawls 361 are deflected by stops 359 against the action of springs 363 so that the pawls ride over the stops 359. A tension spring 364, connected between the plate 357 and the arm 351, aids in the movement of the arm 351 and holds the arm against the stops 359.

The rear margin of the stack of paper on the tray 41 is aligned by deflectors 317 which are positioned to contact the trailing edge of the stack lightly to hold the paper in position on the tray. The deflectors 317 are pivotally secured to the depending supports 318 of bracket 319 by pins 336. Each deflector is normally biased outward from the depending supports, in a clockwise direction as seen in FIG. 7, by a coil spring 337. Each spring 337 encircles a pin 336 with one end of the spring butting against the deflector and the opposite end of the spring butting against the depending support.

Stub shafts 338, fixed to the ends of the bracket, are journaled in frame plates 301 and 302 to permit this entire assembly to be rotated out of the position shown in FIG. 7 to facilitate loading of paper onto the tray. Movement of this assembly in a counterclockwise direction is limited by stop pins 388 extending from the frame plates 301 and 302.

A cam 389 is fixed to the opposite end of one of the stub shafts to actuate an interlock switch 24LS mounted on frame 302, when the assembly is raised to permit loading of paper onto the tray.

With the sheet stack adjusted to the proper height and the guides positioned according to the size of the paper by the above-described mechanism, the sheets may be seriatim fed from the top to the paper transport 44.

The sheet separating mechanism for separating the top sheet from the stack includes a number of suction feet 365 which by suction pick up the topmost sheet and advance the sheet between the idler rolls 42 and the belts of the paper transport system 44. The idler rolls 42 are canted in the path of sheet feed at an angle in the horizontal plane. The slight canting from a position parallel to the path of sheet travel causes the leading edge of the paper to be pulled taut by the equal but opposite forces exerted through the idler roller 42 sandwiching the sheet between these rollers and the belts of the paper transport 44. The forces exerted on the sheet at an angle from the paper path prevents the sheet material from sagging and ensures proper delivery to the sheet transport 44. Wing guide plates 404 secured to shaft 354 by appropriate brackets are positioned to engage the leading corners of the sheet and to lift the corners of the sheet into contact with the paper transport 44 to ensure proper sheet forwarding.

The suction foot 365 comprises a hollow tube secured at one end to hollow manifold tube 366 journaled at opposite ends in pivot arms 367. One end of the tube 366 is sealed and has a suitable limiting valve 316 to control the suction pressure, and the opposite end of the tube is connected to it by a flexible conduit 368 to the inlet of a vacuum pump, not shown, driven by a suitable motor. A cam follower arm 369, carrying cam follower 370 is also secured to the manifold tube 366. The opposite ends of pivot arms 367 are secured to rock shaft 371 journaled in plates 301 and 302.

The shaft 371 extends through the side frame 302 and has secured thereon a cam follower arm 372 which imparts a rocking motion to the shaft as the cam follower 373 is actuated by cam 374.

The rocking of the rock shaft 371 will cause the outer ends of pivot arms 367, carrying manifold tube 366, to travel in an arc. As this happens, the cam follower 370 on cam follower arm 369 is biased by spring 375 into engagement with a cam plate 376, secured to side frame member 301.

The cam plate 376 has a substantially vertical guide surface terminating in a horizontal guide surface so that the follower 370 traces a path along the vertical and then the horizontal guide surfaces, as the rock shaft 371 is rotated in a clockwise direction, as seen in FIG. 2, the lower ends of the suction feet will be raised from a position in contact with the topmost sheet upward as the cam follower engages the vertical guide surface of the cam plate 376. Continued rocking motion of the rock shaft will cause the suction feet to rotate about the axis of manifold tube 366 towards the idler rolls 42 and the belts of the paper transport 44 as the cam follower moves along the horizontal guide surface.

Figure 6:
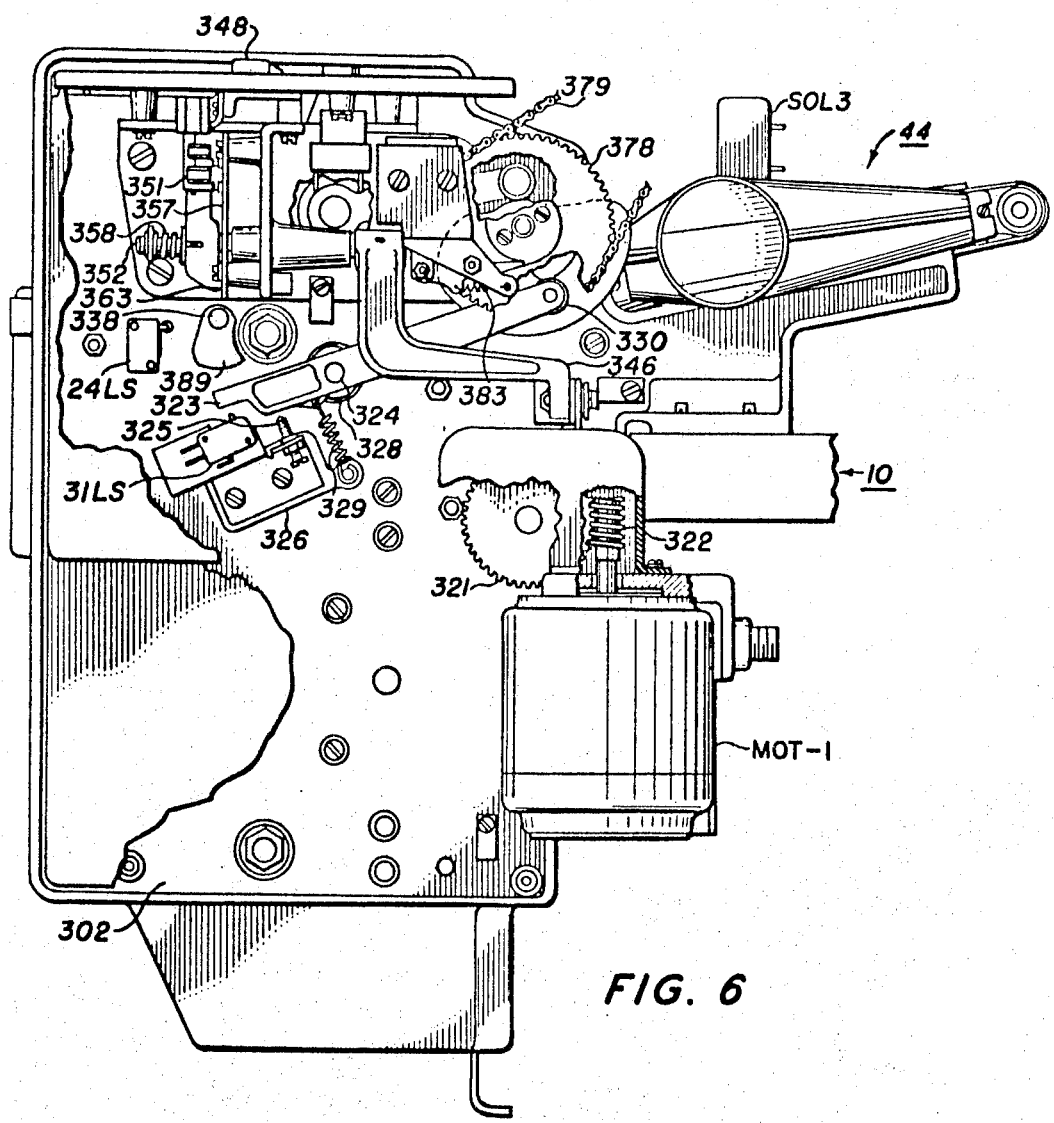
FIG. 6 is a rear view of the sheet handling mechanism the cover panel broken away to show the internal elements of the mechanism.

Operation of the suction paper feet and the raising of the sensing arm 327 is effected and synchronized by having a rigid connection between the two cams 331 and 374. This is effected by mounting these two cams on shaft 377. A gear 378, driven by chain 379 from a motor, not shown, is rotatably mounted on the shaft 377 and is secured to a first plate or drum 380 of a clutch 381. The clutch 381 is of the type which has a second plate or drum 384 secured to the rotating shaft and a coil spring 385 around both drums. When the movement of the spring is unrestricted, the diameter of the spring is in driving contact with the two drums so that the shaft is rotated. When rotational movement of the coil spring is restrained the inner diameter of the spring disengages both drum surfaces and driving action stops. In the present embodiment, as shown in FIGS. 6 and 10, a pawl 382, which is biased towards the clutch 381 by spring 383, is solenoid actuated to restrain the movement of the clutch spring 385 by catching an indentation in spring retaining sleeve 386. The operation of the paper feed solenoid SOL-1 is suitably affected by means not described since it forms no part of the subject invention, reference being made to copending application Ser. No. 400,363. When the clutch 381 is actuated by disengagement of the pawl 382 from sleeve 386, the gear 378 which is continuously rotating, serves to drive the shaft 377 and rotate the cams 331 and 374. Since the cams 331 and 374 are directly connected, the operation of the suction sheet feeder and the sheet lever sensing arm are synchronized. The solenoid SOL-1 immediately releases the pawl 382 after it is disengaged from the sleeve 386, and the spring 383 returns the pawl to a position against the clutch 381 so that after one revolution the pawl again engages the sleeve 386. Thus, the clutch is essentially a one revolution clutch. There is a second internal coil spring 387 which permits one directional movement of the clutch so that the pressure of the cam followers on the cam cannot produce overriding of the shaft.

In order to insure that the suction feet 365 start from the same position on each cycle a third cam 390 is mounted on shaft 377. A cam follower arm 391 and a cam follower 392 are biased against the cam 390 by a tension spring 393 and acts as a brake to stop the rotation of shaft 377 with the suction feet 365 in position to start the next cycle. As the clutch 381 rotates the shaft 377 through one cycle, the cam follower 392 drops into an indentation 394 in the cam 390 and stops rotation of shaft 377. When the cycle is started the initial driving force from gear 378 is sufficient to rotate the cam 390 forcing the follower 392 out of the indentation.

Referring again to the separation of single sheets from the stack, the pressure side of the pump is connected by conduits 397 to manifold conduits 395 positioned near the leading edge and the leading corners of the stack of sheets. Apertures 396, in the manifold conduits direct air under pressure towards the leading edges of the topmost sheets of the stack whereby these sheets are loosened from each other and lifted to the proper height for removal by the suction feet. When the suction feet are in contact with a sheet, air is drawn into the pump through valve 316.

To ensure seriatim feeding of single sheets and to prevent the removal of those superposed, flexible snubber tabs 410 are provided at the leading edge of the stack of sheet material and located between the suction feet extending a predetermined amount over the stack. The snubber tabs 410 are of a resilient material and formed with one end extending above and parallel to the leading edge of the stack of sheets and the other end secured in a block support secured to the paper feeder frame by means of brackets 411. The unique construction of the resilient snubber tabs 410 and their positioning relative to the suction feet 365 has been found to substantially decrease the number of superposed sheets forwarded to the sheet transport 44. The tabs 410 extend above and parallel to the topmost sheet of the stack of paper between the vacuum suction feet 365 and over the leading edge of the paper so that the forward edges of the snubber tabs 410 are in line with the center line of the suction feet 365 which extend at right angles to the path of sheet travel. As the paper is aerated by the air from the manifold conduits 395 lifting the topmost sheet on the air cushion created thereby, the vertical height of the sheets is limited by the snubber tabs 410. When the suction feet 365 engage the topmost sheet flexing the tabs 410 out of interference with the topmost sheet for forwarding to the sheet conveyor 44, the upward force due to the suction feet 365 and the restraining force caused by the snubber tabs 410 create a deformation or kink in the paper which in the event of superposed sheets strips the bottom sheet or sheets from the sheet being fed. This stripping of the superposed sheets is believed to be caused by internal forces in the paper fiber being exerted against the deformation to relieve the stresses created thereby. In addition, a floating constraining pin 333 engages each leading corner of the stack of sheets, to constrain the topmost sheet in a proper configuration to enable the suction feet 365 to forward the sheet to the paper transport 44. The pins 333 are suitably secured in a slotted block 433, which is slidable in a vertical direction on pins secured to the corner guides 332 and passing through the block 433.

In operation, as air is emitted through the manifold conduits 395 against the leading edge and corners of the stack of sheet material, a plurality of the topmost sheets float up from the stack engaging the constraining pins 333 and engage the snubber tabs 410 which limit the vertical movement of the sheet material. The floating guide bar 401 constrains the center section of the sheets in a manner such that the forward portion of the sheets float in the trapped air cushion created by the air from the manifold conduits, while the rearward portion of the sheets remains in contact with the stack. In order to prevent the air cushion from creating a buckle in the portion of the sheets between the snubber tabs 410 and the floating guide bar 401, a floating roller 420 is provided to continually rest on the topmost sheet and to freely rotate as the sheet is fed from the stack by the suction feet 365 to prevent constraining the sheet during paper feeding. The roller 420 is supported by brackets 421 secured to frame plates 301 and 302, in which the roller can be freely rotated on the bearing portions 419 secured to each end of the shaft 420.

The canted idler rolls 42, which cooperate with the belts of paper transport 44, are rotatably mounted on arms 353 journaled on shaft 354 which is secured against rotation between frame plates 301 and 302. Each of the arms 353 is biased by a torsion spring 355 to yieldingly force the idler roll, with which it cooperates, against the surface of a belt or against a sheet sandwiched therebetween. One end of each torsion spring is secured to a spring retaining collar 356 fixed to shaft 354 and the other end of each spring is secured to the arm 353 with which it co-acts. As previously stated the rolls 42 are canted at an angle in the plane of paper feed to prevent the paper from buckling and to stretch the sheet out smoothly for proper forwarding by the conveyor 44.

Figure 14:
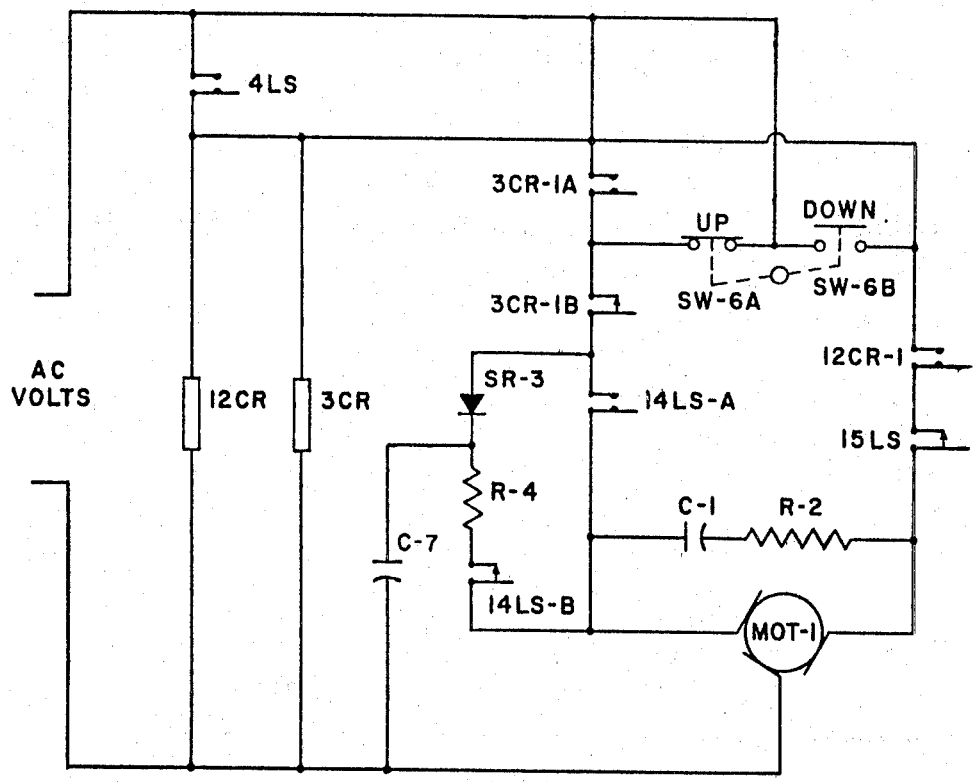
FIG. 14 is a schematic electrical wiring diagram of the sheet mechanism index motor circuit.

Referring now to FIG. 14 illustrating a schematic illustration of the paper feeder elevator or index motor circuit, the circuit is connected to a suitable source of power. The circuit includes the index motor MOT-1 controlled by paper feeder up index limit switch 14LS actuated by the sheet sensor bar 327, previously described. With "up" contact SW6A of index switch closed, a circuit is partly completed through normally closed contact 3CR1B of relay 3CR, the only break in this circuit being the contact 14LSA of index limit switch 14LS. However, as sheets are fed from the stack of sheets, the sheet sensor bar 327 will drop sufficiently to actuate the switch 14LS closing its contact 14LSA to energize the index motor MOT-1 to raise the stack until the sheet sensor bar is disengaged from the index limit switch 14LS. This cycle of operation continues during normal operation of the machine.

If the supply of paper is nearly exhausted the "low" paper limit switch 4LS is actuated closing its contact which completes a circuit to energize relays 3CR and 12CR.

As this occurs, contact 3CR1A closes and contact 3CR1B opens to establish a holding circuit to relays 12CR and 3CR through the closed "up" contact SW6A and contact 3CR1A. Contact 12CR1 closes and provides power to the "down" portion of the elevator motor through the down limit switch 15LS, normally closed. Now the motor operates to lower the paper tray 41 until the down limit switch 15LS is actuated to break this circuit.

The operator must now load additional paper in the paper tray 41 and then press the up button of switch SW6, to momentarily open the contact SW6A, normally biased into a closed position, to break the circuit to relays 3CR and 12CR, the low paper limit switch 4LS opening as soon as the paper tray was lowered. The up index limit switch 14LS again takes over control of this motor until the sensing bar is again lifted out of contact with this switch 14LS to open its contact stopping the upward progress of the paper tray as determined by the height of the stack of paper positioned on the tray. Lifting of the sensor bar will also open switch 31LS breaking the circuit to relay 27CR, allowing its contact 27CR2 to again close to complete the circuit to print switch SW4A and the ready lamps.

The operator can also lower the paper tray to add paper by depressing the down button for index switch SW6 to close the contact SW6B which completes a circuit to relays 12CR and 3CR, the index motor then being energized through the circuits previously described.

The purpose of rectifiers SR3, normally closed contact 4LSB and capacitor C7 is to provide a holding torque on motor MOT-1 when it is not operating. The capacitor C-1 and resistor R-2 are part of the circuit for the motor itself. The motor MOT-1 is preferably a *Slo-Syn* synchronous motor adapted to be electrically connectable for reversible rotation, for example, a Number SS-150-1077 electric motor manufactured by the Superior Electric Co., Bristol Conn.

Figure 12:
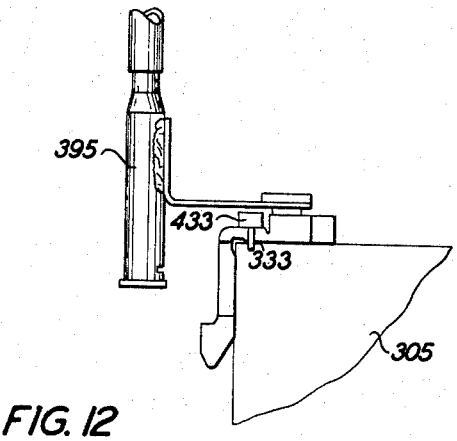
FIG. 12 is an enlarged view of the side manifold tubes and floating restraining pins.
Figure 13:
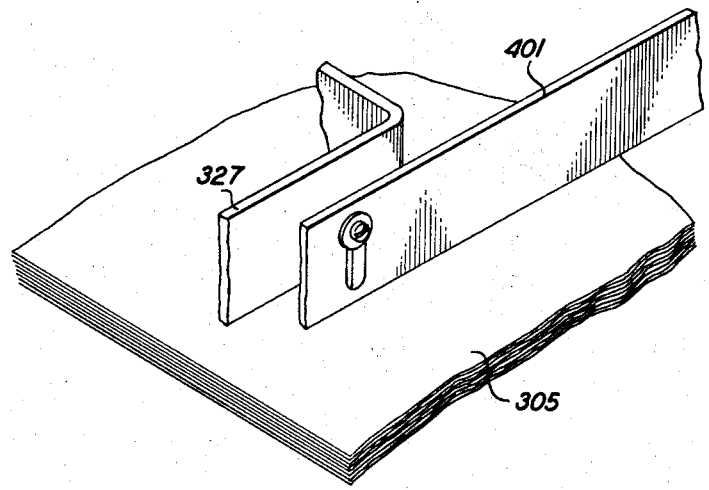
FIG. 13 is an enlarged sectional view of the sensor bar to better illustrate the floating guide bar.

It is apparent that the circuit shown in FIG. 12 can be incorporated into a circuit for the entire xerographic apparatus and that relays 3CR and 12CR can have more contacts than shown for use in such an overall circuit, which may be a circuit as disclosed in the above referenced application Ser. No. 400,363.

While the invention has been described with reference to the structure disclosed herein, it is not to be confined to the specific details set forth or to the specific environment set forth. Modifications or changes may readily become apparent to those skilled in the art, and, therefore, this application is intended to cover such modifications or changes as may come within the purposes of the improvements of the scope of the following claims.

What is claimed is:

1. In a xerographic reproducing machine operative throughout relative humidity ranges of approximately 15% to approximately 85% a paper handling apparatus comprising
- a tray for supporting a stack of sheets having a concave surface to prevent a convex configuration of the stack of sheet supported thereon,
- elevating means connected to said tray for raising and lowering said tray,
- switch means operatively connected to said elevating means to actuate said elevating means in one direction to raise said tray,
- aerating means positioned in cooperative relation to the stack of sheet material supported on said tray to introduce a controlled discharge of aeriform fluid against the leading edge and leading corners of said stack creating an air cushion so that a plurality of the topmost sheets will be fanned and separated from said stack, control means positioned in contact with the topmost sheet of said stack to limit the penetration of aeriform fluid to the leading portion of said stack so that the movement of the topmost sheets of said stack by said air cushion is limited to a vertical direction, constraining means positioned in contact with the topmost sheet of said stack to constrain the degree of concavity of said topmost sheet in a predetermined configuration by limiting the vertical movement of said topmost sheets supported on said air cushion created by said aerating means, guide means positioned adjacent said stack of sheet material engaged by said topmost sheet as said topmost sheet is moved along a path of paper feed to stress said leading edge in a horizontal plane and elevate the leading corners of said sheet into proper relationship with a sheet forwarding mechanism, sensor means adapted to coact with the topmost sheet of said stack of sheets on said tray to control the stack height so that said stack is supported in cooperative relation with said aerating means, means for oscillating said sensor means out of contact with the topmost sheet of the stack as the topmost sheet is fed from said stack, means operatively connected to said sensor means to actuate said switch means to energize said elevating means when the height of the stack of sheets falls below a predetermined height, and low paper sensing means operatively connected to said tray and to said elevating means and switch means to overcome the operation of said switch means to effect operation of said elevating means to lower said tray.

2. A paper handling apparatus adapted to facilitate the seriatim feeding of sheets of various thickness under extreme ambient environmental conditions including a tray for supporting a stack of sheets having a concave surface to prevent a convex configuration of the stack of sheets supported thereon, aerating means positioned in cooperative relation to the stack of sheet material supported on said tray to introduce a controlled discharge of aeriform fluid against the leading edge and leading corners of said stack creating an air cushion so that a plurality of the topmost sheets will be fanned and separated from said stack, control means positioned in contact with the topmost sheet of said stack to limit the penetration of aeriform fluid to the leading portion of said stack so that the movement of the topmost sheets of said stack by said air cushion is limited to a vertical direction, constraining means positioned in contact with the topmost sheet of said stack to constrain said topmost sheet in a predetermined configuration by limiting the vertical movement of said topmost sheets supported on said air cushion created by said aerating means, guide means positioned adjacent said stack of sheet material engaged by said topmost sheet as said topmost sheet is moved along a path of paper feed to stress said leading edge in a horizontal plane and elevate the leading corners of said sheet into proper relationship with a sheet forwarding mechanism.

3. The apparatus of claim 2 wherein said aerating means includes a plurality of manifold conduits positioned adjacent the leading edge and leading corners of the stack of sheet material to introduce aeriform fluid into the stack of sheet material against the leading edge in a direction parallel to the path of paper feed and against the leading corners of the stack of sheet material in a direction approximately at right angles to the path of paper feed.

4. The apparatus of claim 2 wherein said control means includes a floating guide bar positioned to continuously contact the topmost sheet of the stack of sheet material so that the flow of aeriform fluid into said stack is limited by said floating guide bar.

5. The apparatus of claim 2 wherein said constraining means includes a plurality of restraining members positioned to contact the leading corners of the topmost sheet and movable in a vertical direction therewith so that the vertical movement of the leading corners of the topmost sheet is limited thereby, a plurality of resilient snubber tabs positioned at the leading edge of the stack of sheet material between the suction tubes and said movable restraining pins to limit the vertical movement of said topmost sheets and said movable restraining pins, said snubber tabs extending above and parallel to the topmost sheet of said stack a distance approximately equal to the distance the center line of the suction tubes lies from the leading edge of said stack when the suction tubes contact the top of the stack of sheet material, and a roller positioned between said snubber tabs and said control means in continuous contact with the topmost sheet of said stack and vertically movable therewith so that said roller limits the vertical movement of said topmost sheets and is rotated thereby as said topmost sheet is fed from said stack of sheet material.

6. The apparatus of claim 2 wherein said guide means includes a plurality of idler rolls outwardly canted in a plane horizontal to the path of paper feed so that a force is exerted on the topmost sheet at approximately a right angle to the path of paper feed as said sheet is fed along the path of movement to stress said sheet for proper registration with a sheet forwarding mechanism, and a plurality of guides positioned adjacent said idler rolls to engage the leading corners of the topmost sheet of the stack of sheet material so that the leading corners of said sheet are raised into proper registration with a sheet forwarding mechanism.

7. In a paper feeding mechanism of the type wherein suction tubes engage a portion of the topmost sheet of a stack of sheet material and forward the sheet to a sheet conveyor mechanism, the improvement comprising aerating means positioned in cooperative relation to the stack of sheet material to introduce a controlled discharge of aeriform fluid against the stack to thereby create an air cushion so that a plurality of the topmost sheets will be fanned and separated from the stack, resilient snubber tabs positioned at the leading edge of the stack between the suction tubes adapted to create a predetermined deformation in a plurality of sheets being fed by said suction tubes when acted upon by said aerating means to strip the topmost sheet from said plurality of sheets and to be flexed out of interference with the topmost sheet as it is forwarded to a sheet conveyor by the suction tubes, said resilient snubber tabs extending above and substantially parallel to the direction of feed of the topmost sheet of said stack a distance approximately equal to the distance the center line of the suction tubes lies from the leading edge of the stack when the suction tubes contact the top of the stack of sheet material.

References Cited

UNITED STATES PATENTS 3,149,833   9/1964   Rolon _____ 271—62

RICHARD E. AEGERTER, *Primary Examiner.*